(12) United States Patent
McKnight et al.

(10) Patent No.: US 9,066,511 B2
(45) Date of Patent: Jun. 30, 2015

(54) CRAWLING ARTHROPOD INTERCEPTING DEVICE AND METHOD

(75) Inventors: Susan McKnight, West Hartford, CT (US); Changlu Wang, West Lafayette, IN (US)

(73) Assignees: Purdue Research Foundation, West Lafayette, IN (US); Susan McKnight, Inc., Memphis, TN (US)

( * ) Notice: Subject to any disclaimer, the term of this patent is extended or adjusted under 35 U.S.C. 154(b) by 247 days.

(21) Appl. No.: 13/134,150

(22) Filed: May 31, 2011

(65) Prior Publication Data

US 2011/0225873 A1    Sep. 22, 2011

Related U.S. Application Data

(62) Division of application No. 12/387,645, filed on May 5, 2009.

(60) Provisional application No. 61/126,698, filed on May 6, 2008.

(51) Int. Cl.
*A01M 1/00* (2006.01)
*A01M 1/10* (2006.01)
*A01M 1/20* (2006.01)
*A01M 29/34* (2011.01)
*A01M 1/02* (2006.01)

(52) U.S. Cl.
CPC ............... *A01M 29/34* (2013.01); *A01M 1/026* (2013.01); *A01M 1/103* (2013.01)

(58) Field of Classification Search
CPC ......... A01M 1/00; A01M 1/10; A01M 1/103; A01M 1/2011; A01M 1/24
USPC .......................... 43/121, 123, 132.1, 131, 109
See application file for complete search history.

(56) References Cited

U.S. PATENT DOCUMENTS

| 21,726 | A | * | 10/1858 | Shell | 43/121 |
| 41,919 | A | * | 3/1864 | Henderson | 43/109 |
| 52,576 | A | * | 2/1866 | Lamb | 43/121 |
| 57,338 | A | * | 8/1866 | Lake | 43/109 |
| 137,936 | A | * | 4/1873 | Legab | 43/109 |
| 140,954 | A | * | 7/1873 | Rubarth | 43/121 |

(Continued)

FOREIGN PATENT DOCUMENTS

| BE | 388543 | 6/1932 |
| BE | 408033 | 3/1935 |

(Continued)

OTHER PUBLICATIONS

Aboul-Naser AE, Erakey MAS, On the behavior and sensory physiology of the bed-bug 1. Temperature reactions (Hemmiptera: Cimicidea), Bull. Soc. Entomol. Egypte 51:53-54, 1967.

(Continued)

*Primary Examiner* — Darren W Ark

(57) ABSTRACT

An intercepting device (e.g. a furniture coaster device) is placed under furniture (bed, sofa, chair. etc.), other climable object, or the floor adjacent an object to intercept crawling arthropods and other crawling pests. The intercepting device can be used to monitor the presence of crawling arthropods and other crawling pests (such as bed bugs, ants, cockroaches, beetles, spiders, etc.), reduce pest numbers, and monitor efficacy of pest control procedures. The intercepting device includes pitfall trap surfaces that form multiple pitfall traps.

12 Claims, 2 Drawing Sheets

(56) References Cited

U.S. PATENT DOCUMENTS

| | | | | |
|---|---|---|---|---|
| 147,226 | A * | 2/1874 | Defranceschini | 43/121 |
| 223,321 | A * | 1/1880 | Denton | 43/109 |
| 317,322 | A * | 5/1885 | Dosh | 43/109 |
| 427,143 | A * | 5/1890 | Bauchmuller | 43/109 |
| 431,815 | A * | 7/1890 | Linder et al. | 43/109 |
| 460,429 | A * | 9/1891 | Conrad | 43/109 |
| 479,976 | A * | 8/1892 | Elwood | 43/109 |
| 533,017 | A * | 1/1895 | Peeler | 43/109 |
| 559,414 | A * | 5/1896 | Smith | 43/109 |
| 898,852 | A * | 9/1908 | Duggan | 43/109 |
| 908,760 | A * | 1/1909 | Dumesnil | 43/109 |
| 944,568 | A * | 12/1909 | Mercer | 43/121 |
| 963,483 | A * | 7/1910 | Swartz | 43/109 |
| 1,164,219 | A * | 12/1915 | Rush | 43/109 |
| 1,221,999 | A * | 4/1917 | Kreiter | 43/109 |
| 1,248,283 | A * | 11/1917 | Derck et al. | 43/109 |
| 1,265,481 | A * | 5/1918 | Mosby | 43/121 |
| 1,279,865 | A * | 9/1918 | Hendershot et al. | 43/109 |
| 1,380,054 | A * | 5/1921 | Friend | 43/109 |
| 1,390,734 | A * | 9/1921 | Stevens | 43/109 |
| 1,402,998 | A * | 1/1922 | Anderson | 43/109 |
| 1,450,662 | A * | 4/1923 | Biggs | 43/109 |
| 1,456,395 | A * | 5/1923 | Moll et al. | 43/109 |
| 1,471,630 | A * | 10/1923 | Parrella | 43/109 |
| 1,489,672 | A * | 4/1924 | Robertson | 43/109 |
| 1,497,992 | A * | 6/1924 | Schulte | 43/109 |
| 1,562,248 | A * | 11/1925 | Nielsen | 43/109 |
| 1,581,410 | A * | 4/1926 | Welsh | 43/109 |
| 1,584,079 | A * | 5/1926 | Cook | 43/121 |
| 1,614,157 | A * | 1/1927 | Schneider | 43/123 |
| 1,621,318 | A * | 3/1927 | Edwards et al. | 43/121 |
| 1,667,048 | A * | 4/1928 | Rawlings | 43/121 |
| 1,684,279 | A * | 9/1928 | Humphrey | 43/109 |
| 1,700,517 | A | 1/1929 | Ross | |
| 1,745,905 | A * | 2/1930 | Oakman | 43/109 |
| 1,788,325 | A * | 1/1931 | Ramsey | 43/109 |
| 1,800,613 | A * | 4/1931 | Farrell | 43/109 |
| 1,822,307 | A * | 9/1931 | Nettekoven | 43/121 |
| 1,944,784 | A * | 1/1934 | Cook | 43/123 |
| 1,990,049 | A * | 2/1935 | Perry | 43/109 |
| 2,167,978 | A * | 8/1939 | Jennerich | 43/121 |
| 2,258,317 | A * | 10/1941 | Clipper | 43/109 |
| 2,356,022 | A * | 8/1944 | Wright | 43/109 |
| 2,435,317 | A * | 2/1948 | McGrew | 43/121 |
| 2,606,391 | A * | 8/1952 | McGrew | 43/121 |
| 2,763,091 | A * | 9/1956 | Mann | 43/121 |
| 2,790,417 | A * | 4/1957 | Brembeck | 119/81 |
| 2,936,926 | A * | 5/1960 | Miller | 220/571 |
| 2,997,806 | A * | 8/1961 | Duvall | 43/121 |
| 3,441,003 | A * | 4/1969 | Lister et al. | 43/121 |
| 3,851,417 | A * | 12/1974 | Wunsche | 43/121 |
| 3,901,192 | A | 8/1975 | Adams | 119/57.9 |
| 4,030,233 | A * | 6/1977 | Wunsche | 43/121 |
| 4,128,080 | A | 12/1978 | Haney | 119/51.5 |
| 4,263,740 | A * | 4/1981 | Hemsarth et al. | 43/121 |
| 4,399,772 | A | 8/1983 | Salinas | 119/51.5 |
| 4,608,774 | A * | 9/1986 | Sherman | 43/121 |
| 4,698,934 | A * | 10/1987 | Gonzalez et al. | 43/121 |
| 4,953,506 | A * | 9/1990 | Sanders | 119/61.53 |
| 5,042,192 | A * | 8/1991 | Osteen | 43/109 |
| 5,090,153 | A * | 2/1992 | Mullen et al. | 43/121 |
| 5,113,798 | A | 5/1992 | Rera | 119/61.53 |
| 5,125,363 | A | 6/1992 | McGaha | 119/51.5 |
| 5,134,802 | A * | 8/1992 | Cogan et al. | 43/121 |
| 5,148,626 | A * | 9/1992 | Haake, Sr. | 43/121 |
| 5,165,365 | A * | 11/1992 | Thompson | 119/61.53 |
| 5,189,830 | A * | 3/1993 | Montemurro | 43/121 |
| 5,253,609 | A * | 10/1993 | Partelow et al. | 119/61.53 |
| 5,277,149 | A * | 1/1994 | East | 119/51.5 |
| 5,392,559 | A * | 2/1995 | Long | 43/121 |
| 5,414,954 | A * | 5/1995 | Long | 43/121 |
| 5,440,833 | A * | 8/1995 | Stoll | 43/109 |
| 5,561,941 | A * | 10/1996 | Long | 43/121 |
| 5,566,500 | A * | 10/1996 | Long | 43/121 |
| 5,771,628 | A * | 6/1998 | Nobbs | 43/121 |
| 5,857,428 | A * | 1/1999 | Gitzen | 119/61.53 |
| 5,881,671 | A * | 3/1999 | Riedl | 43/109 |
| 5,926,999 | A * | 7/1999 | Vernon et al. | 43/121 |
| 5,996,531 | A * | 12/1999 | Anderson | 43/109 |
| 6,041,543 | A * | 3/2000 | Howse | 43/121 |
| 6,164,009 | A * | 12/2000 | Clarke | 43/132.1 |
| 6,327,810 | B1 * | 12/2001 | Howse | 43/121 |
| 6,378,242 | B1 * | 4/2002 | Roberts | 43/109 |
| 6,484,437 | B2 * | 11/2002 | Roberts | 43/109 |
| 6,505,433 | B2 * | 1/2003 | Roberts | 43/109 |
| 6,510,648 | B2 * | 1/2003 | Roberts | 43/132.1 |
| 6,513,280 | B2 * | 2/2003 | Roberts | 43/109 |
| 6,739,087 | B2 * | 5/2004 | Weiser et al. | 43/121 |
| 6,860,062 | B2 * | 3/2005 | Spragins | 43/121 |
| 7,171,778 | B1 * | 2/2007 | Thompson, III | 43/121 |
| D648,819 | S * | 11/2011 | Bronk | D22/122 |
| D668,314 | S * | 10/2012 | MacKay et al. | D22/122 |
| 8,635,807 | B2 * | 1/2014 | Frisch et al. | 43/123 |
| 8,707,615 | B2 * | 4/2014 | Cullen | 43/123 |
| 8,966,812 | B2 * | 3/2015 | McKnight | 43/123 |
| 2001/0042338 | A1 * | 11/2001 | Jackson | 43/121 |
| 2005/0138858 | A1 * | 6/2005 | Lyng | 43/121 |
| 2006/0021275 | A1 | 2/2006 | Howse | 43/107 |
| 2006/0150473 | A1 | 7/2006 | Bette | 43/131 |
| 2007/0044372 | A1 * | 3/2007 | Lang et al. | 43/114 |
| 2008/0017775 | A1 | 1/2008 | Gary | 248/346.11 |
| 2009/0145019 | A1 * | 6/2009 | Nolen et al. | 43/121 |
| 2009/0145020 | A1 * | 6/2009 | McKnight | 43/123 |
| 2009/0282728 | A1 * | 11/2009 | McKnight et al. | 43/109 |
| 2011/0047860 | A1 * | 3/2011 | Black et al. | 43/123 |
| 2011/0072711 | A1 | 3/2011 | Black et al. | 43/123 |
| 2011/0099886 | A1 * | 5/2011 | Siljander et al. | 43/121 |
| 2011/0107654 | A1 * | 5/2011 | Wieler | 43/131 |
| 2011/0203159 | A1 | 8/2011 | McKnight | 43/123 |
| 2012/0060406 | A1 * | 3/2012 | Schneidmiller et al. | 43/123 |
| 2012/0096759 | A1 * | 4/2012 | Biggs | 43/123 |
| 2012/0204477 | A1 * | 8/2012 | Fairleigh et al. | 43/121 |
| 2013/0042520 | A1 * | 2/2013 | Snell | 43/121 |
| 2013/0111801 | A1 * | 5/2013 | White et al. | 43/109 |
| 2013/0180161 | A1 * | 7/2013 | Vasudeva et al. | 43/123 |
| 2013/0318861 | A1 * | 12/2013 | Roeder | 43/123 |
| 2014/0020279 | A1 * | 1/2014 | Cogley | 43/121 |
| 2014/0075825 | A1 * | 3/2014 | Vasudeva et al. | 43/123 |
| 2014/0090290 | A1 * | 4/2014 | Baschnagel, III | 43/123 |
| 2014/0259879 | A1 * | 9/2014 | Logsdon | 43/123 |

FOREIGN PATENT DOCUMENTS

| | | |
|---|---|---|
| DE | 299 15 546 | 12/1999 |
| JP | 55-162549 U | 11/1980 |
| JP | 08-256658 | 10/1996 |
| WO | WO 99/26471 | 6/1999 |
| WO | WO 2005/120224 | 12/2005 |

OTHER PUBLICATIONS

Aboul-Naser AE, Erakey MAS, Behaviour and sensory physiology of-the bed-bug, *Cimex lectularius* L., to some environmental factors: chemoreception, Bull. Soc. Entombl . Egypte 52:353-62, 1968.

Aboul-Naser AE, Erakey MAS, The effect of contact and gravity reactions upon the bed-bug, *Cimex lectularius* L., Bull. Soc. Entomol. Eypte 52:363-370, 1968.

Barrozo R.B., Lazzari C.R., The respones of the blood-sucking bug *Triatoma infestans* to carbon dioxide and other host odours, Chem. Senses 29:319-329, 2004.

Barrozo R.B., Lazzari C.R., Orientation behaviour of the blood-sucking bug *Triatoma infestans* to short-chain fatty acids: Synergistic effect of L-Lactic Acid and Carbon Dioxide, Chem. Senses 29:833-841, 2004.

Busvine, J.R., Insects and Hygiene, 3rd ed. London: Chapman and Hall, pp. 230-245, 1980.

Cwilich R., Nier GG., Meron AV, Bedbugs resistant to gamma BHC (lindane) in Israel, Nature 170:636-7, 1957.

Doggett S., A code of practice for control of bed bug infestations in Australia (Draft), Dept. of Medical Entomology, Westmead Hospital, Westmead NSW, 2005.

(56) References Cited

OTHER PUBLICATIONS

Doggett S., Encasing mattresses in black plastic will not provide thermal control of bed bugs, *Cimex* spp. (Hemiptera:Cimicidae), J. Econ. Entomol. 99:2132-2135, 2006.

Fletcher MG, Axtell RC, Susceptibility of the bed bug, *Cimex lectularius*, to selected insecticides and various treated surfaces, Med. Vet. Entomol, 7:69-72, 1993.

Gratz NG, A survey of bed-bug resistance to insecticides in Israel, Bull. Wld. Hlth. Org., 20:835-840, 1959.

Hartnack H, Unbidden House Guests, Hartnack Publishing Co, Tacoma, Washington, pp. 60-61, 1943.

Hebert M., Get the roll surface right, www.ptonline.com/articles/200403fa3.html Nov. 11, 2007.

Lehane MJ, Biology of Blood-Sucking Insects, Cambridge, UK: Cambridge University Press, 2nd edition, pp. 32-43, 2005.

Lofgren CS, Keer JC, Burden GS, Resistance tests with the bed bug and evaluation of insecticides for its control, J. Econ. Entomol., 51:241-4, 1958.

Mallis A., Handbook of Pest Control, MacNair-Dorland Company, New York, pp. 1132, 1960.

Marx R, Über die Wirtsfindung und die Bedeutung des artspezifischen Duftstoffes bei *Cimex lectularius* Linné, Z. Parasintenkd, 17:41-73, 1955.

Marshall AG, The ecology of ectoparasitic insects, Academic Press, pp. 459, 1981.

Mellanby K, The physiology and activity of the bed bug (*Cimex lectularius* L.) in a natural infestation, Parasitology, 31:200-211, 1939.

Moore DJ, Miller DM, Laboratory evaluations of insecticide product efficacy for control of *Cimex lectularius*, J. Econ. Entomol., 99:2080-6, 2006.

Murlis J., Elkinton JS, Cardé RT, Odor plumes and how insects use them, Ann. Rev. Entomol., 37:505-32, 1992.

Overal. WL, Wingate LR, The biology of the batbug *Stricticimex antennatus* (Hemiptera: Cimicidae) in South Africa, Ann. Nat. Mus. Pietermaritzb, 22:821-28, 1976.

Panagiotakopulu E, Buckland PC, *Cimex lectularius* L., the common bed bug from Pharaonic Egypt, Antiquity, 73:908-11, 1999.

Quarles W, Bed Bugs Bounce Back, Te IPM Practitioner, 24(3/4):1-8, 2007.

Reinhardt K, Siva-Jothy MT, Biology of the Bed Bugs (*Cimicidae*), Annu. Rev. Entomol., 52:351-74, 2007.

Rivnay E., Studies in tropisms of the bed bug *Cimex lectularius* L., Parasitology, 24:121-36, 1932.

Romero A, Potter ME, Potter DA, Haynes KF, Insecticide resistance in the bed bug: a factor, in the pest's sudden resurgence, J. Med. Entomol., 44:175-8, 2007.

Schofield SW, Sutcliffe JF, Human individuals vary in attractivenes for host-seeking black flies (Diptera: Simuliidae) based on exhaled carbon dioxide, J. Med. Entomol., 33:102-108, 1996.

Sutcliffe JF, Distance orientation of bitting flies to their hosts, Inect Sci. Applic., 8:611-616, 1987.

Usinger R, Monograph of *Cimicidae* (Hemiptera-Heteroptera), The Thomas Say Foundation, vol. 7, 1966.

Wainwright SA, Mechanical Design in Organisms, John Wiley & Sons, NY, 1976.

Wright L., Warm & Snug: The history of the bed, Sutton Publishing, 1962.

\* cited by examiner

CRAWLING ARTHROPOD INTERCEPTING DEVICE AND METHOD

RELATED APPLICATION

This application is a division of U.S. Ser. No. 12/387,645 filed May 5, 2009, which claims benefits and priority of provisional application Ser. No. 61/126,698 filed May 6, 2008, the disclosure of which is incorporated herein by reference.

FIELD OF THE INVENTION

The invention provides a crawling arthropod intercepting device that can be placed under or adjacent furniture (bed, sofa, chair, etc.) and other objects to intercept crawling arthropods including crawling insects and other crawling pests.

BACKGROUND OF THE INVENTION

The bed bug, *Cimex lectularius* L. (Phylum Arthropoda, Class Insecta, Order Hemiptera, Family Cimicidae) has sucked the blood of humans for thousands of years (Panagiotakopulu & Buckland 1999). The tropical bed bug, *Cimex hemipterus* Fabr., also has a long history of sucking the blood of humans in the tropics and subtropics. To complicate matters, there is a small group of related blood sucking bugs in the family Cimicidae including bat bugs and swallow bugs that will feed on humans and can be confused with human bed bugs. All of these human blood sucking bugs have no tarsal pads and can only climb a vertical surface by using tarsal claws hooked into a rough surface (Usinger, 1966).

Bed bug adults are reddish-brown, oval, wingless, flattened insects about 6-9 mm long that are readily seen with the naked eye. Newly hatched bugs feed at the first opportunity. They molt five times before reaching maturity and require at least one blood meal between each molt. Bed bug adults often survive up to 2 months without food, but under certain circumstances can live a year or more without feeding. Bed bugs are active during the nighttime and hide during the daytime into tiny crevices or cracks. They rapidly move into a refuge when disturbed by light or air movement so they are rarely seen by the person who is bitten. Bed bugs are able to cling to possessions using tarsal claws and hide in small spaces so that they may easily be transported in a traveler's belongings (Usinger 1966).

Most U.S. householders of this generation have never seen a bed bug (Busvine 1980). In the 1940s and 1950s in U.S. and Europe, DDT sprays replaced all other methods of bed bug control resulting in a decline in bed bug infestations (Mallis 1960).

DDT was very effective but the first bed bug resistance to DDT was observed by Johnson and Hill in 1948. As time went by and different pesticides were used, bed bugs developed resistance to each in turn (Cwilich et al. 1957, Fletcher & Axtell 1993, Lofgren et al. 1958, Moore and Miller 2006). During the last decade, bed bugs have become a serious commercial health problem in resort hotels, apartments, college dormitories, and cruise ships. Less effective and shorter acting bed bug pesticides have contributed to the resurgence of human bed bugs and a world-wide pandemic is taking place (Doggett et al. 2006, Romero et al. 2007). When hungry, bed bugs actively seek and find humans using a combination of cues (Lehane 2005, Reinhardt & Siva-Jothy 2007). Carbon dioxide is an activator and attractant to bed bugs (Marx 1955). Heat is an attractant to bed bugs (Rivnay 1932, Aboul-Nasr & Erakey 1967). And, as with all blood-sucking arthropods, host-emitted odors are reliable cues for both activation behaviors and attraction behaviors (Aboul-Nasr & Erakey 1968a, Sutcliffe 1987, Murlis et al. 1992).

Prior work using human attraction cues to lure crawling blood-sucking arthropods other than bed bugs is known. Montemurro in U.S. Pat. No. 5,189,830 in 1993 discloses trap using carbon dioxide to attract ticks. Keenan in U.S. Pat. No. 5,258,176 in 1993 discloses the use of heat and volatile odors to attract fleas and ticks to trap.

A rough, vertical surface is attractive to bed bugs. To walk up a vertical surface, around a human body, or upside down under a bed, bed bugs use their hook-like tarsal claws to engage fibers and surface roughness (Usinger 1960). Hungry bed bugs tend to crawl upward on rough surfaces and bed bugs will crawl on cotton or wool (Aboul-Nasr & Erakey 1968b). Bat bugs walk up the walls of caves and will climb vertically up a rough piece of wood (Overal & Wingate 1976). In contrast, a smooth surface is repellent to bed bugs and bed bugs will avoid the smooth surface of silk (Aboul-Nasr A& Erakey 1968b). Smooth glass containers are used routinely to contain laboratory colonies of crawling insects because they cannot gain traction on smooth surfaces (Marshall 1981). By the mid $18^{th}$ century, cheap metal bedsteads were known to deter bed bugs (Wright 1962).

The pitfall trap is an adaptation of hunting techniques that dates back to primitive man. The basic insect pitfall trap outdoors comprises a container (a jar, can, or other container) buried in the soil so that the top edge of the container is at the same level of soil surface or just below the soil surface. Crawling insects and spiders fall into the trap and are unable to escape because they cannot climb up the smooth interior surface. Cockroach traps with pitfall aspects have caught bed bugs (Mellanby 1939).

Smooth, hard surface of pitfall interior surface can be created from glass, ceramics, metals, finish treatments on polished wood, finish treatments on paper, and plastics. The surface roughness (Ra) of an optical grade mirror finish is 0 to 0.5 microinch (0.0127 micron), of a satin finish is 50 to 60 microinch (1.27 to 1.524 micron), and of an embossed or coarsely textured product is up to 300 microinch (7.62 micron) (Hebert 2007).

Many crawling insect traps with pitfall aspects or moats to prevent insects from reaching food have been disclosed. For example, U.S. Pat. No. 2,790,417 issued to Brembeck, U.S. Pat. No. 5,277,149 issued to East, U.S. Pat. No. 3,441,003 issued to Du Mond et al., U.S. Pat. No. 5,148,626 issued to Haake, U.S. Pat. No. 5,253,609 issued to Partelow et al., U.S. Pat. No. 5,165,365 issued to Thompson, U.S. Pat. No. 5,113,798 issued to Rera, U.S. Pat. No. 4,128,080 issued to Haney, U.S. Pat. No. 5,125,363 issued to McGaha and U.S. Pat. No. 4,399,772 issued to Salinas all employ a device that may prevent crawling insects such as ants and cockroaches from reaching a pet food dish. Sherman in U.S. Pat. No. 4,608,774 in 1986 discloses an indoor pitfall trap for cockroaches. Spragins in U.S. Pat. No. 6,860,062 in 2005 discloses an adaptation of an outdoor pitfall trap for both crawling and flying insects.

U.S. Pat. No. 4,953,506 issued to Sanders also discloses a device that may prevent crawling insects such as ants and cockroaches from reaching a food dish. However, this patented device requires the use of a sticky substance to trap the crawling insects. This patent will trap insects as long as the insects themselves cannot form a physical bridge over the sticky substance. The Lang U.S. Patent application No.

20070044372 for a bed bug monitor trap also requires the use of a sticky substance to trap and it also discloses use of heat as an attractant for bed bugs.

U.S. Pat. No. 2,167,978 issued to Jennerich, U.S. Pat. No. 1,265,481 issued to Mosby, U.S. Pat. No. 944,568 issued to Mercer. U.S. Pat. No. 52,576 issued to Lamb, U.S. Pat. No. 533,017 issued to Peeler, and U.S. Pat. No. 21,726 issued to Shell, all teach devices devoted to trapping insects.

U.S. Pat. No. 3,901,192 issued to Adams discloses a bird feeder having a cup like container for the bird seed that is protected by moat or pesticide from crawling insects. U.S. Pat. No. 5,440,833 issued to Stoll discloses a device that creates a double catchment area barrier between an item to be protected and insects that could crawl downward from an overhead surface or upward from below.

U.S. Pat. No. 5,881,671 issued to Riedl discloses apparatus that can be attached to a pet food dish or picnic table leg capable of preventing crawling insects from infesting a food source.

U.S. Pat. Nos. 6,505,433. 6,510,648 and 6,513,280 issued to Roberts discloses a coaster for shielding against crawling arthropods.

SUMMARY OF INVENTION

The invention provides a crawling arthropod intercepting device that can be placed under or adjacent furniture (bed, sofa, chair, etc.) and other objects to intercept crawling arthropods including crawling insects and other crawling pests. An illustrative embodiment of the invention comprises an intercepting device that is adapted to be placed on a floor under a furniture leg (bed leg, sofa leg, chair leg, etc.) or climable upstanding surface of other objects which may be or become infested in order to intercept crawling arthropods including crawling insects and other crawling pests and prevent them from moving between the furniture (or other object) and the floor. In another illustrative embodiment of the invention, the intercepting device can be placed on the floor adjacent furniture or other object to intercept crawling arthropods. The intercepting device can be used to monitor the presence of crawling arthropods including crawling insects and other crawling pests (such as bed bugs, ants, cockroaches, beetles; spiders, scorpions etc.), reduce pest numbers, and monitor efficacy of pest control procedures.

A particular illustrative embodiment of the invention provides an intercepting device comprising an exterior, upstanding climable surface that crawling arthropods such as crawling insects can climb and first and second pitfall traps disposed inwardly of the climable exterior surface for trapping crawling arthropods, wherein the first pitfall trap comprises an inner receptacle that receives a leg of furniture or other object and the second pitfall trap comprises an outer receptacle and wherein crawling arthropods are trapped in the inner receptacle and/or outer receptacle as a result of being unable to climb out, preventing crawling arthropods from moving between the furniture (or other object) and the floor. The exterior surface is tactically attractive to crawling arthropods and has a fibrous or otherwise rough surface to render the exterior surface readily climbable by them. The double pitfall traps include slick (low friction) upstanding surfaces that crawling arthropods cannot climb so that they are trapped in the pitfall traps, preventing them from moving between furniture (or other object) and the floor. Crawling arthropods moving on the device will fall into one of the traps and can be killed by an optional killing agent (soapy water, ethylene glycol, diatomaceous earth, etc.) provided in one or both of the pitfall traps and/or on one or more pitfall trap surfaces.

The present invention is advantageous and useful as a bed bug interception coaster device which serves to detect bed bugs approaching and departing the bed, sofa or other object and to monitor the efficacy of extermination efforts. The present invention enlists observed bed bug responses to the presence of a host, tactile surfaces, and gravity. Humans are effectively acting as bait for a trap.

Other advantages of the intercepting device of the present invention will become more readily apparent from the following detailed description taken with the following drawings.

DETAILED DESCRIPTION OF THE INVENTION

Figure 1A:
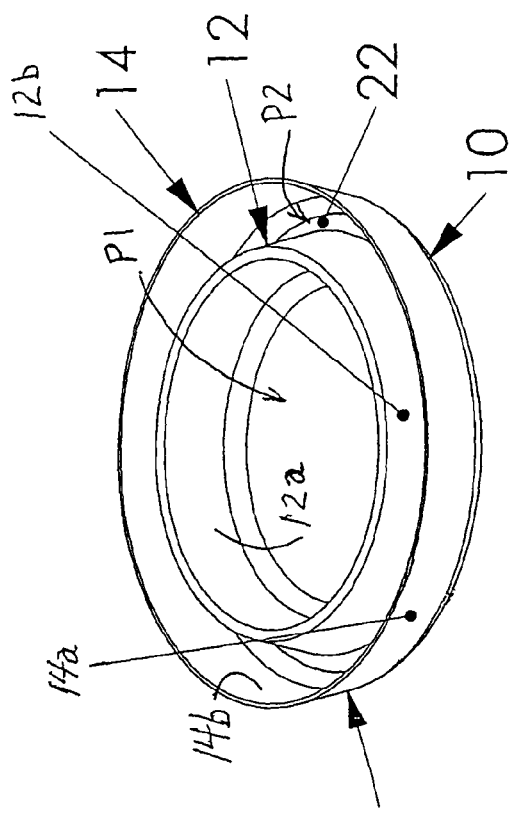
FIGS. 1a, 1b, and 1c are perspective, plan and sectional views, respectively of a one-piece intercepting device pursuant to an embodiment of the invention.

The present invention provides a one-piece or multi-piece intercepting device for intercepting crawling arthropods that include, but are not limited to, crawling insects, spiders, millipedes, centipedes, scorpions, and others. An embodiment of the invention provides an intercepting device comprising an upstanding, exterior climable surface that crawling arthropods can climb and further comprises upstanding pitfall trap surfaces that are disposed inwardly of the climbable surface to form multiple pitfall traps where crawling arthropods are trapped in a manner preventing them from moving between the floor (which includes the ground) and an arthropod-climable upstanding surface of an object such as including, but not limited to, a leg of furniture (bed, sofa, chair, etc.) or other object such as including, but not limited to, kitchen and other appliances, a walker, wheel chair (whose wheels are parked on the devices), computer, TV, stereo, other electronic and other equipment, and the like to intercept and trap crawling arthropods leaving the object to forage for a blood meal. The intercepting device also can be placed on the floor or ground adjacent an object to intercept crawling arthropods in the vicinity of the object.

An inner pitfall trap can comprise an inner receptacle for receiving a climable portion of the object (e.g. a support or base leg of furniture or other object) and an outer pitfall trap can comprise an outer receptacle (moat) disposed about the inner receptacle such that the receptacles provide double pitfall traps.

An illustrative embodiment of the invention provides an intercepting device D described herebelow having an inner receptacle 20 for receiving a furniture leg L and crawling arthropod intercepting annular-shaped, outer receptacle 22 disposed about the leg-receiving inner receptacle 20. The device comprises an upstanding exterior antropod-climable surface 14a that crawling arthropods can climb and double (first and second) pitfall traps P1, P2 disposed inwardly of the exterior surface 14a for trapping the arthropods and formed by receptacles 20, 22, respectively. The exterior surface 14a is rendered tactically attractive to crawling arthropods by having a fibrous or otherwise rough surface to render the exterior surface 14a readily climbable by the crawling arthropods. The double pitfall traps include slick (low friction) upstanding pitfall trap surfaces 12a, 12b, and 14b that crawling arthropods cannot climb or have difficulty climbing so that they are trapped in the traps P1, P2, preventing antropods from moving between furniture (or other object) and the floor.

Arthropods moving on the intercepting device will fall into the receptacles 20 and/or 22 and be trapped and can be killed by an optional killing agent (soapy water, ethylene glycol, diatomaceous earth, etc.) inside the coaster device.

Figure 1B:
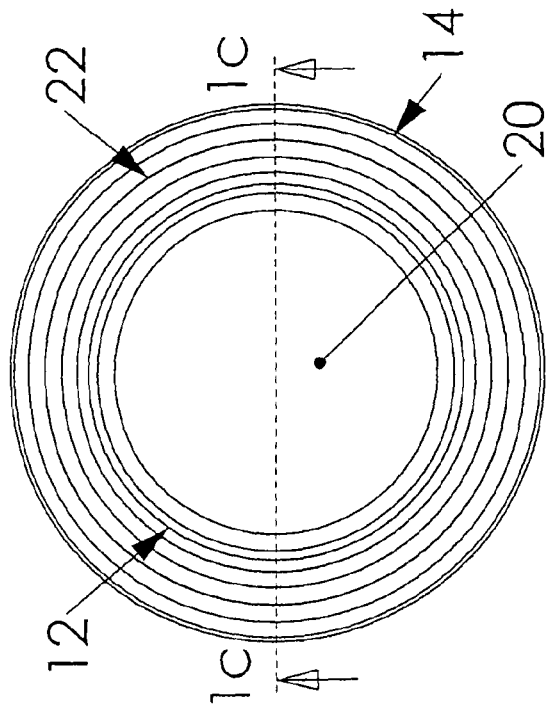
Figure 1C:
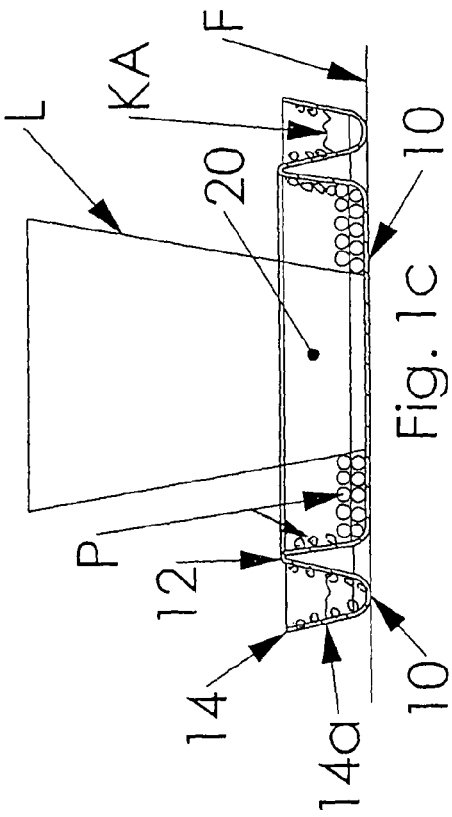

Referring to FIGS. 1a, 1b, and 1c, a particular illustrative one-piece intercepting device D comprises a bottom wall 10 for resting on a floor (or ground) and inner and outer upstanding peripheral walls 12, 14 that are molded, cast, machined, or otherwise formed integral with the bottom wall 10 and collectively form a respective inner receptacle 20 and outer, annular receptacle (moat) 22 such that the receptacles provide the double pitfall traps P1, P2. The climbable surface 14a and the pitfall trap surface 14b are disposed on outer peripheral wall 14, while the pitfall trap surfaces 12a, 12b are disposed on the inner peripheral wall 12 of the one-piece device. Although the walls 12,14 are shown as circular, the invention is not so limited since the walls 12, 14 can have any shape or configuration.

The inner receptacle 20 is adapted to receive a furniture leg L (e.g. bed leg, sofa leg, chair leg, and the like or other arthropod climbable portion of another object).

The arthropod intercepting device can be molded of durable material such as high density polyethylene or polypropylene thermoplastic. The exterior climbable surface 14a of the outer peripheral wall 14 has a surface texture rough enough to render the exterior surface readily climbable by the crawling arthropods. For purposes of illustration, the exterior surface 14a has a surface roughness Ra greater than about 300 microinches. To this end, the exterior climbable surface 14a of the outer peripheral wall 14 can be textured or covered with fabric (e.g. fabric with fibers 10 to 181 microns in diameter or sawdust to provide traction for bed bug tarsal claws) to facilitate arthropods climbing the wall 14. Alternately, a rough texture can be molded, machined or otherwise provided on the surface 14b to this end. The upstanding surfaces 12a, 12b of the peripheral wall 12 and the upstanding inner peripheral surface 14b of the outer peripheral wall 14 are slippery (low friction) so that crawling arthropods cannot climb or have difficulty climbing the surfaces whereby they are trapped in the inner receptacle 20 or outer receptacle 22, preventing arthropods from moving between the furniture and the floor. The slippery surfaces can have the appropriate low friction as result of being made of a slippery material, such as polymer, glass, or polished metallic material having a relatively low coefficient of friction and/or by providing a friction-reducing (lubricating) substance thereon to this end. For purposes of illustration, the surfaces 12a, 12b and 14b have a molded or polished surface roughness Ra of about 100 microinches or less to this end.

A lubricating (friction-reducing) powder P preferably is dusted onto the pitfall trap surfaces 12a, 12b, and 14b as a thin dust layer and also placed inside the smaller inner receptacle 20 effective to prevent arthropods from moving out of the inner receptacle 20 and outer receptacle 22. The powder can comprise talcum powder, polytetrafluoroethylene (PTFE) particles or powder, or other particle or powder substances capable of rendering the surfaces unclimbable by crawling arthropods after the powder is applied. The powder can be applied to surfaces 12a, 12b, 14b using a cotton ball carrying the powder and brushing or dusting the surfaces 12a, 12b, 14b with the cotton ball to deposit a thin powder layer thereon. Other non-powder friction-reducing substances also can be applied to the surfaces 12a, 12b, and 14b to this end.

If a user does not wish to handle live trapped crawling arthropods, insects or pests, an optional killing agent KA (e.g. a powder or liquid such as ethylene glycol, soapy water, candle or other oil) may be placed on one or more of the pitfall trap surfaces and/or inside the receptacles.

In practice of an embodiment of the invention, a distance of one (1) cm or more is provided between the inner and outer peripheral walls 12, 14. For purposes of illustration and not limitation, the thickness of the walls 12, 14 can be about 3 cm, while the height of the walls 12, 14 can be about 3-5 cm with the inner wall 12 being one (1) cm higher than the outer wall 14 in the event the furniture does not have any legs or the legs are very short. The diameter of inner receptacle 20 can be 8 cm or greater.

According to an illustrative method embodiment of the invention, the device D is placed on a floor under each leg L of furniture, FIG. 1c, to prevent crawling arthropods from moving between the furniture and the floor F on which the furniture resides. The lubricating powder P (e.g. talcum powder) is dusted as a thin dust layer onto the pitfall trap surfaces 12a, 12b, 14b and placed inside the smaller receptacle 20 to prevent crawling arthropods from moving out of the receptacles 20, 22. The lubricating powder can be applied before or after the device is placed under the furniture leg. The killing agent KA (e.g. a powder or liquid such as ethylene glycol, soapy water, candle oil, etc.) may be optionally placed inside the larger annular receptacle 22 but may be omitted.

Figure 2:
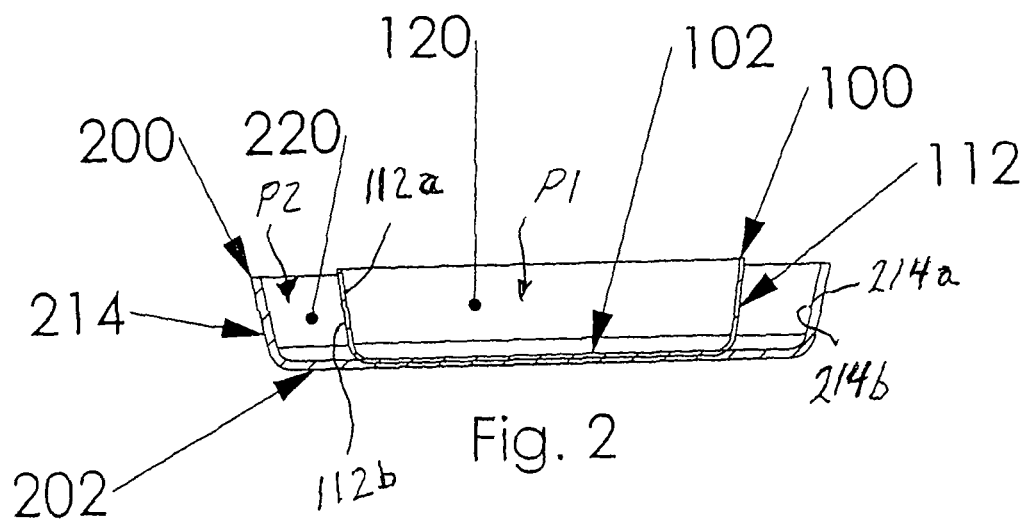
FIG. 2 is a sectional view of a two-piece intercepting device pursuant to another embodiment of the invention.

The intercepting device can comprise multiple components such as illustrated in FIG. 2 where the device is shown including two components; namely, an inner, smaller coaster device 100 having a bottom wall 102 and upstanding peripheral wall 112 forming a receptacle 120 (pitfall trap P1) to receive a furniture leg. The inner smaller coaster device resides in a larger coaster device 200 having a bottom wall 202 and upstanding peripheral wall 214 forming a larger receptacle 220 (pitfall trap P2) to receive the inner coaster device 100 such that receptacles provide double pitfall traps. The coaster device 220 includes an upstanding, exterior climbable surface 214a. The coaster devices include pitfall trap surfaces 112a, 112b, and 214b. Once assembled, there is a one (1) cm or more distance between the two coaster devices 100, 200 (i.e. between peripheral walls 112, 214). The thickness of the coaster walls 112, 214 can be about 3 cm. The height of the coaster devices can be 3-5 cm and diameter of the small coaster device can be 8 cm or more. The smaller coaster device 100 can be 1 cm higher than larger coaster device 200 in case the furniture does not have any legs or the legs are very short.

A lubricating powder (not shown) of the type described above is applied onto pitfall trap surfaces 112a, 112b, and 114b and placed inside the smaller coaster 100 effective to prevent crawling arthropods from moving out of the pitfall traps P1, P2. An optional killing agent (not shown in FIG. 2 but see FIG. 1c) such as a powder or liquid including, but not limited to, ethylene glycol, soapy water, candle oil, etc. may be placed on one or more of the pitfall trap surfaces and/or inside the outer, larger coaster 200.

According to another method embodiment of the invention, the smaller coaster device 100 is placed inside the larger coaster device 200. The smaller coaster device 100 is either permanently fixed to the center of the larger coaster device 200, or can be separate from the larger coaster device 200. Each furniture leg L is placed inside a respective smaller coaster device 100 on the floor. The lubricating powder P (e.g. talcum powder) is dusted as a thin dust layer onto the pitfall trap surfaces 112a, 112b, 114b and placed inside the smaller receptacle 20 to prevent crawling arthropods from moving out of the receptacles 120, 220. The lubricating powder can be applied before or after the device is placed under the furniture leg. If a user does not wish to handle live trapped crawling arthropods, an optional killing agent (a powder or liquid such as ethylene glycol, soapy water, candle oil) may be placed on one or more of the pitfall trap surfaces and/or inside the larger coaster device 200.

EXAMPLES

The present invention is useful as a bed bug interception coaster device, FIG. 1a-1c or FIG. 2, which serves to detect bed bugs approaching and departing the bed, sofa or other object and to monitor the efficacy of extermination efforts. The present invention enlists observed bed bug responses to the presence of a host, tactile surfaces, and gravity. Humans are effectively acting as bait for a trap.

In an example, the bed bug interception coaster device is placed on the floor under every leg of bed or upholstered furniture where bed bug activity is suspected and/or where people sleep. The coaster device provides a mechanical barrier between the floor and person and provides a tactically attractive climbing surface for bed bugs to climb into the coaster device. Also, the coaster device provides a mechanical barrier between the bed bugs in the mattress and the harborage locations in the remainder of the room.

The bed bug interception coaster device is designed for use by the general public or professional pest control technicians as a mechanism for detecting the presence of a suspected bed bug infestation, as a preventative to re-infestation after control measures have been effective, and as a means of determining if a bed bug infestation remains in the bedding or is coming from hiding places in the room.

Bed bugs may be trapped alive in the two capture chambers (i.e. receptacles 20, 22 or 120, 220). When the coaster device is serviced, bed bugs may be brushed out or flushed out of the capture receptacle (moat) 22 or 220 with water for disposal in sanitary sewer or into container for kill by crushing or microwave prior to disposal in trash. A drying powder such as dust of silica dioxide or a drowning liquid such as candle oil may be placed in either capture receptacle 20, 22. The trap is durable and reusable.

The bed bug interception coaster device can have dimensions described above in connection with FIGS. 1a-1c and 2. The height of the exterior climbing wall 14 is not limited by bed bug behavior. Since bed bugs crawl on top of one another, the depth of the capture moat (receptacle 22 or 220) may be increased to hold more bed bugs between servicing of trap. Also, the trap may be made of polypropylene or any other thermoplastic, glass, ceramics, metals, finish treatments on polished wood or finish treatments on paper that can provide a mirror to satin finish hard surface.

The climbing surface of the bed bug interception coaster device may be vertical or slope at an acute angle or at an obtuse angle to the floor F. The climbing surface 14a or 214a must provide enough traction (surface roughness) for the bed bugs to engage their hooked tarsal claws much like a person climbing a ladder. Surface roughness (Ra) in excess of 300 microinch as is present in unfinished wood or sand-paper provides sufficient traction on the outer peripheral wall. To provide traction, the climbing surface of the outer peripheral wall is covered in fabric composed of synthetic or natural fibers with a diameter of 10 microns to 181 microns, sawdust, or molded paper pulp.

The walls of the smooth capture moat (receptacle 22 or 220) are near to vertical to create the pitfall. The surface of the capture moat is to be smooth enough that no traction is provided for the bed bugs to engage their hooked tarsal claws on surface irregularities. A hard surface finish of high density polypropylene or polypropylene with a roughness average (Ra) of 100 microinch (2.54 micron) or less, smooth glass or polished metal does not provide traction for the bed bugs.

Bed bug interceptor devices of the multi-component type described above were tested in bed bug infested apartment building. The devices were placed under legs of beds and sofas that had been treated by steam for the control of bed bugs. The devices were monitored for three weeks. All devices collected bed bugs.

TABLE 1

Effectiveness of bed bug coasters (interception devices) for reducing bed bug numbers and evaluating treatment efficacy. The coasters (interception devices of FIG. 2) were installed under legs of furniture. The apartments were treated with hot steam and insecticide dust or spray immediately before the installation of coasters. Additional treatments were applied 2-3 times during the course of the study.

| Apartment | Coaster locations | Total number of bed bugs trapped in coasters after initial treatment | | | |
|---|---|---|---|---|---|
| | | 0-2 week | 2-4 week | 4-6 week | 6-8 week |
| 1 | Sofa, bed | 246 | 95 | 43 | 26 |
| 2 | Bed | 34 | 5 | 2 | 0 |
| 3 | Bed | 20 | 1 | 0 | 0 |
| 4 | Bed | 12 | 4 | 7 | 7 |
| 5 | Bed | 6 | 1 | 0 | 1 |
| 6 | Bed | 58 | 14 | 7 | 7 |
| 7 | Sofa, bed | 22 | 7 | 8 | 4 |
| 8 | Bed | 71 | 444 | 226 | 291 |

TABLE 2

Effectiveness of bed bug coasters (interception devices of FIG. 2) installed under furniture. The coasters (interception devices) were installed under legs of furniture. The apartments were treated with hot steam and insecticide dust or spray immediately before the installation of coasters. The small coaster corresponds to the inner receptacle and the large coaster corresponds to the annular receptacle described above for the insect intercepting device. Additional treatments were applied 2-3 times during the course of the study.

| Apartment | Total number of trapped bed bugs in 8 weeks | |
|---|---|---|
| | Small coaster | Large coaster |
| 1 | 38 | 372 |
| 2 | 2 | 39 |
| 3 | 1 | 20 |
| 4 | 0 | 30 |
| 5 | 0 | 8 |
| 6 | 1 | 85 |
| 7 | 1 | 40 |
| 8 | 54 | 978 |

In still another test, bed bug interceptor devices of the type described above in connection with FIGS. 1a, 1b having pitfall trap surfaces (12a, 12b, 14b) lubricated with talcum powder were tested in thirteen (13) apartments from a high-rise building that had previous bed bug infestations or that were adjacent to apartments with known infestations. Visual inspection, resident awareness, and the bed bug interceptor devices were evaluated for detecting very light bed bug infestations in these apartments.

The inspections revealed that all 13 apartments were infested with bed bugs. Average bed bug count was 6.7 per apartment. Among the residents interviewed, only four of ten said they noticed bed bug bites. After visual inspection and hand removal of bed bugs, the bed bug interceptor devices were installed under furniture legs. After seven days, an average of 8.8 bed bugs per apartment was captured using the interceptor devices.

The bug interceptor devices pursuant to the invention thus were more effective than visual inspections for determining the presence/absence of bed bugs and estimating bed bug numbers. The devices effectively detected low levels of bed bug infestation. Because the devices remove bed bugs, they provide immediate relief to residents from bites and reduce the need for insecticide applications as they catch the bugs. The intercepting device pursuant to the invention can be used as an insect barrier and/or insect monitor by home owners, hotel managers, apartment managers, pest control managers and others. The devices are advantageous in that they are convenient to use, efficient, and low in cost.

In another example of practice of another method embodiment of the invention, one-piece interceptor devices of the type described above were tested by being placed on the floor immediately beside or adjacent a refrigerator in six different apartments. Counts for cockroaches were made 2-3 weeks after deployment. Cockroach count was 1, 2, 9, 58, 0, and 49, respectively for the six different apartments. Scorpions and bed bugs also have been captured with intercepting devices placed on floors. Suitable baits can be placed on or in the intercepting device in practicing this embodiment.

The invention envisions in an alternative embodiment an intercepting device of the type described above yet bifurcated or formed as multiple parts to provide capability to install the device around the base of a heavy or immovable object. For example, by removing the floor or bottom wall of the inner pitfall (inner receptacle), cutting the device in half (e.g. along a diameter), lap beveling the edges, and adding a an optional snap-fit or clasping element, the device can be provided with further utility and flexibility. In the absence of the floor or bottom wall of the inner pitfall, some glue, putty, or tape may be needed to properly seal the device to an irregular floor, thereby preventing the bed bugs and other arthropods from crawling under the device. The floor of the inner pitfall then could be reinserted into the inner pitfall (inner receptacle) to return the device to ordinary operation.

Although the present invention has been described above in connection with certain illustrative embodiments, those skilled in the art will appreciate that changes and modifications can be made thereto within the spirit and scope of the invention as set forth in the appended claims.

References

| U.S. Patent Documents | | |
|---|---|---|
| 21,726 | October 1855 | Shell |
| 52,576 | February 1866 | Lamb |
| 533,017 | January 1895 | Peeler |
| 944,568 | December 1909 | Mercer |
| 1,265,481 | May 1918 | Mosby |
| 2,167,978 | August 1939 | Jennerich |
| 2,790,417 | April 1957 | Brembeck |
| 3,441,003 | April 1969 | Du Mond |
| 3,901,192 | August 1975 | Adams |
| 4,128,080 | December 1978 | Haney |
| 4,399,772 | August 1983 | Salinas |
| 4,608,774 | Sep. 2, 1986 | Sherman |
| 4,953,506 | September 1990 | Sanders |
| 5,113,798 | May 1992 | Rera |
| 5,125,363 | June 1992 | McGaha |
| 5,148,626 | September 1992 | Haake |
| 5,253,609 | October 1992 | Partelow |
| 5,165,365 | November 1992 | Thompson |
| 5,189,830 | Mar. 2, 1993 | Montemurro |
| 5,258,176 | Nov. 2, 1993 | Keenan |
| 5,277,149 | January 1994 | East |
| 5,440,833 | Aug. 15, 1995 | Stoll |
| 5,881,671 | Mar. 16, 1999 | Riedl |
| 6,505,433 | Jan. 14, 2003 | Roberts |

-continued

| U.S. Patent Documents | | |
|---|---|---|
| 6,510,648 | Jan. 28, 2003 | Roberts |
| 6,513,280 | Feb. 4, 2003 | Roberts |
| 6,860,062 | Mar. 5, 2005 | Spragin |

OTHER REFERENCES

Aboul-Nasr A E, Erakey M A S. 1967. On the behavior and sensory physiology of the bed-bug. 1. Temperature reactions (Hemiptera: Cimicidae). Bull. Soc. Entomol. Egypte 51:43-54.

Aboul-Nasr A E, Erakey M A S. 1968a. Behaviour and sensory physiology of the bed-bug. *Cimex lectularius* L., to some environmental factors: chemoreception. Bull. Soc. Entomol. Egypte 52:353-62.

Aboul-Nasr A E, Erakey M A S. 1968b. The effect of contact and gravity reactions upon the bed-bug, *Cimex lectularius* L. Bull. Soc. Entomol. Egypte 52:363-370.

Busvine, J. R. 1980. *Insects and Hygiene*. 3rd ed. London: Chapman and Hall, pp. 230-245.

Cwilich R, Nier G G, Meron A V. 1957. Bedbugs resistant to gamma BHC (lindane) in Israel. Nature 170:636-7.

Doggett S L, Geary M J, Russell R C. 2006. Encasing mattresses in black plastic will not provide thermal control of bed bugs, *Cimex* spp. (Hemiptera: Cimicidae). J Econ Entomol 99:2132-2135.

Fletcher M G, Axtell R C. 1993. Susceptibility of the bed bug, *Cimex lectularius*, to selected insecticides and various treated surfaces. Med Vet Entomol 7:69-72.

Hebert M. 2007. Get the roll surface right. www.ptonline.com/articles/200403fa3.html. Nov. 11, 2007.

Johnson M S, Hill A J. 1948. Partial resistance of a strain of bed bugs to DDT residual. Medical News Letter 12:26-28.

Lehane M J. 2005. Biology of Blood-Sucking Insects. Cambridge, UK: Cambridge Univ. Press. $2^{nd}$ ed.

Lofgren C S, Keller J C Burden G S. 1958. Resistance tests with bedbugs and evaluation of insecticides for its control. J Econ Entomol 51:241-4.

Mallis A. 1960. Handbook of Pest Control. MacNair-Dorland Company, NY, pp. 1132.

Marx R. 1955. Über die Wirtsfindung und die Bedeutung des artspezifischen Duftstoffes bei *Cimex lectularius* Linné. Z. Parasitenkd. 17:41-73.

Marshall A G. 1981. The ecology of ectoparasitic insects. Academic Press. Pp. 459.

Mellanby K. 1939. The physiology and activity of the bed bug (*Cimex lectularius* L.) in a natural infestation. Parasitology 31:200-211.

Moore D J, Miller D M. 2006. Laboratory evaluations of insecticide product efficacy for control of *Cimex lectularius*. J Econ Entomol 99:2080-6.

Murlis J, Elkinton J S, Carde' R T. 1992. Odor plumes and how insects use them. Ann Rev Entomol 37:505-32.

Overal W L, Wingate L R. 1976. The biology of the batbug *Stricticimex antennatus* (Hemiptera: Cimicidae) in South Africa. Ann. Nat. *Mus. Pietermaritzb.* 22:821-28.

Panagiotakopulu E, Buckland P C. 1999. *Cimex lectularius* L., the common bed bug from Pharaonic Egypt. Antiquity 73:908-11.

Reinhardt K, Siva-Jothy M T. 2007. Biology of the Bed Bugs (Cimicidae). Annu. Rev. Entomol. 52:351-74.

Rivnay E. 1932. Studies in tropisms of the bed bug *Cimex lectularius* L. Parasitology 24:121-36.

Romero A, Potter M E, Potter D A, Haynes K F. 2007. Insecticide resistance in the bed bug: a factor in the pest's sudden resurgence? J. Med. Entomol. 44:175-8.

Sutcliffe J F. 1987. Distance orientation of biting flies to their host. Insect Sci. Applic 8: 611-616.

Usinger R. 1966. Monograph of Cimicidae (Hemiptera, Heteroptera). College Park, Md.: Entomol. Soc. Am. 585 pp.

Wainwright S A. 1976. Mechanical Design in Organisms. John Wiley and Sons. NY

Wright L. 1962. Warm & Snug: The History of the Bed. Sutton Publishing.

We claim:

1. A method of intercepting bed bugs between a leg of a bed, an upholstered sofa, or an upholstered chair and a floor, comprising placing a bed bug intercepting device on the floor under the leg of the bed, upholstered sofa, or the upholstered chair with a lower end of the leg received on a bottom wall of an innermost receptacle to provide a path for bed bugs departing from the bed, upholstered sofa, or upholstered chair to enter the innermost receptacle, wherein the innermost receptacle is formed by an upstanding peripheral surface that is slippery to prevent bed bugs from climbing out of the innermost receptacle, wherein the innermost receptacle provides a liquid-free inner pitfall trap of the intercepting device and with an underside of the bottom wall resting directly on the floor, and surrounding the inner pitfall trap by a second liquid-free outer pitfall trap formed by multiple upstanding pitfall trap surfaces disposed between the inner pitfall trap and an upstanding, exterior bed bug-climbable surface of the intercepting device, the second outer pitfall trap comprising an upwardly directed receptacle open at a top thereof, and using a human on the bed, the upholstered sofa, or the upholstered chair as a bed bug bait in capturing bed bugs in one of more of the inner or outer pitfall traps as a result of the upstanding peripheral surface and the pitfall trap surfaces being slippery so that bed bugs cannot climb the upstanding peripheral surface and the pitfall trap surfaces, including capturing any bed bugs departing from the bed, the upholstered sofa, or the upholstered chair in the inner pitfall trap and capturing any bed bugs approaching the bed, the upholstered sofa, or the upholstered chair, from the floor in the outer pitfall trap, whereby an individual can determine whether bed bugs are departing from the bed, upholstered sofa or upholstered chair, or approaching the bed, upholstered sofa or upholstered chair, or both, by visual inspection of the intercepting device.

2. The method of claim 1 including visually inspecting the intercepting device to monitor any trapped bed bugs wherein bed bugs captured in the inner pitfall trap indicate bed bug movement departing from the bed, the upholstered sofa, or the upholstered chair and bed bugs captured in said outer pitfall trap indicate bed bug movement approaching the bed, the upholstered sofa, or the upholstered chair.

3. The method of claim 1 including providing fibrous material on the bed bug-climbable surface.

4. The method of claim 1 wherein the upstanding peripheral surface and the pitfall trap surfaces have a surface roughness Ra of about 100 microinches or less.

5. The method of claim 1 including lubricating the upstanding peripheral surface and the pitfall trap surfaces to be slippery to prevent bed bugs from climbing thereon.

6. The method of claim 1 including applying a lubricating powder onto the upstanding peripheral surface of the innermost receptacle and the pitfall trap surfaces of the outer pitfall trap so as to be slippery to prevent bed bugs from climbing thereon.

7. A method of intercepting bed bugs between a climbable upstanding surface of a leg of a bed, an upholstered sofa, or an upholstered chair and a floor, comprising placing a bed bug intercepting device on the floor under the climbable upstanding surface of a leg of the bed, the upholstered sofa, or the upholstered chair with the climbable upstanding surface of the leg having a lower end received on a bottom wall of an inner receptacle of the intercepting device to provide a path for bed bugs departing from the bed, upholstered sofa, or upholstered chair to enter the inner receptacle and with an underside of the bottom wall resting directly on the floor, wherein the inner receptacle is formed by an upstanding peripheral surface that is slippery to prevent bed bugs from climbing out of the inner receptacle such that the inner receptacle forms a first inner pitfall trap free of liquid around said leg and surrounding the inner receptacle by a second outer receptacle of the intercepting device wherein the outer receptacle is formed between an upstanding inner peripheral surface that is connected to the perpriperal surface of the inner receptacle and an upstanding outer peripheral surface and wherein the inner peripheral surface and the outer peripheral surface of the outer receptacle are slippery to prevent bed bugs in the outer receptacle from climbing out such that the outer receptacle forms a second outer pitfall trap free of liquid, said outer receptacle being accessed by bed bugs approaching the intercepting device by an upstanding, exterior bed bug-climbable surface that is connected to the outer peripheral surface of the outer receptacle, wherein the upstanding peripheral surface of the inner receptacle and the upstanding inner peripheral surface of the outer receptacle ascend to a common peripheral rim that is in such non-overlying relation to the inner receptacle and the outer receptacle that the rim does not impede viewing of the inner receptacle and the outer receptacle from above, and using a human on the bed, the upholstered sofa, or the upholstered chair as bed bug bait in capturing bed bugs in the inner receptacle, the outer receptacle, or both as a result of the bed bugs being unable to climb out, including capturing any bed bugs departing from the bed, the upholstered sofa, or the upholstered chair in said inner receptacle that forms said first inner pitfall trap and capturing any bed bugs approaching the bed, the upholstered sofa, or the upholstered chair in said second outer receptacle that forms said second outer pitfall trap, whereby an individual can determine whether bed bugs are departing from the bed, upholstered sofa or upholstered chair, or approaching the bed, upholstered sofa or upholstered chair from the floor, or both, by viewing the intercepting device from above.

8. The method of claim 7 including visually inspecting the intercepting device to monitor any captured bed bugs wherein bed bugs captured in the inner receptacle indicate bed bug movement departing from the bed, the upholstered sofa, or the upholstered chair and bed bugs captured in said outer receptacle indicate bed bug movement approaching the bed, the upholstered sofa, or the upholstered chair from the floor.

9. The method of claim 7 including providing fibrous material on the bed bug-climbable surface.

10. The method of claim 7 wherein the upstanding peripheral surface, the inner peripheral surface, and the outer peripheral surface have a surface roughness Ra of about 100 microinches or less.

11. The method of claim 7 including lubricating the upstanding peripheral surface, the inner peripheral surface, and the outer peripheral suface to be slippery to prevent bed bugs from climbing thereon.

12. The method of claim 7 including applying a lubricating powder onto the upstanding peripheral surface of the inner receptacle and the inner peripheral surface and the outer peripheral surface of the outer receptacle so as to be slippery to prevent bed bugs from climbing thereon.

* * * * *